April 6, 1965 N. R. KUBNICK 3,176,742

COLLAPSIBLE CARRYING CASE

Filed April 10, 1963 2 Sheets-Sheet 1

Inventor
Norman R. Kubnick
By Barry L. Clark
Attorney

COLLAPSIBLE CARRYING CASE

Filed April 10, 1963 2 Sheets-Sheet 2

Inventor
Norman R. Kubnick
By Barry L. Clark
Attorney

United States Patent Office 3,176,742
Patented Apr. 6, 1965

3,176,742
COLLAPSIBLE CARRYING CASE
Norman R. Kubnick, Wheeling, Ill., assignor to Bell & Howell Company, Chicago, Ill., a corporation of Illinois
Filed Apr. 10, 1963, Ser. No. 271,940
8 Claims. (Cl. 150—34)

My invention relates to an improved self-storing collapsible carrying case. My carrying case has particular utility for holding a camera but is equally suitable for storing other articles such as small radios.

During use, a camera must be removed from its protective case to provide the user with ready access to its operating controls. At this time, the case has no use and is left to either obstruct the freedom of the photographer while on his person, or to be set aside and perhaps even lost. Ideally, the case, when not in use, should be as inobstrusive as possible so as not to hamper the movements of the photographer.

An object of my invention is to provide a protective sheath case that may be folded into a compact, self-contained unit when not in use.

Another object of my invention is to provide a means whereby the case will be positively self contained.

A further object of my invention is to provide a means of partially ejecting the article from the case when its cover is opened.

Yet another object of my invention is to provide a flexible, self-storing camera case with a substantially rigid section that will afford maximum protection to the sensitive electrical and optical components of a camera.

According to my invention, I provide a protective sheath case of flexible material. At one end, a self sustaining section is provided that performs the dual function of protecting the highly sensitive electrical and optical components of a camera, and of forming a compact, substantially rigid, self-storing container for the flexible case itself.

A hinged cover flap and latch are also provided in the end of this rigid section. When the cover flap is opened, the camera is partially ejected from the case by resilient ejecting means contained within the case.

I will now specifically describe my invention with reference to the accompanying drawings in which.

Figures 1, 2, 3:
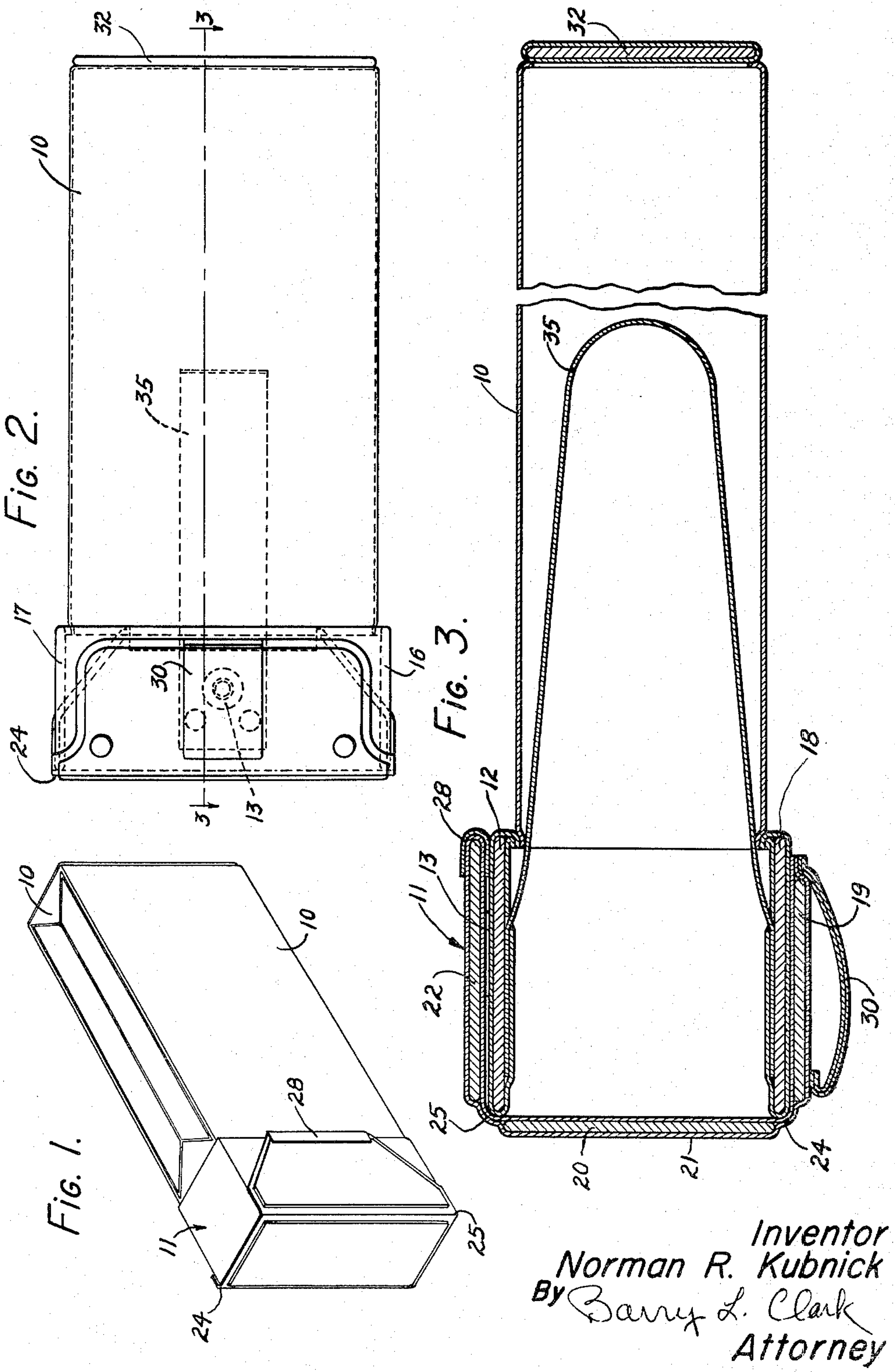
FIG. 1 is a perspective view of the case in its opened or usable condition.
FIG. 2 is a back view of the case.
FIG. 3 is a sectional view of the empty case taken along line 3—3 of FIG. 2.

A major portion of the case includes a bag 10 of flexible material. At one end of the case, a substantially self-sustaining section, generally indicated at 11, is located. This section includes a substantially rigid front wall 12 to which a portion of a cover fastener 13 it attached, side walls 16 and 17, and a back wall 18. Attached to the back wall 18, is a strip 19 of material that, in combination with a cover portion 20 and latching strip 22 form a hinged cover. The hinged cover includes hinges 24, 25 which are preferably formed by the electronic sealing of a flexible plastic material 21 which, in the illustrated embodiment, completely covers the strips 12, 16, 17 and 18 that comprise the self sustaining section of the case. The latching strip 22 may be provided with a portion of a suitable fastener 13 and with a metal grip 28 to facilitate the unlatching of the cover.

As an aid in handling the case, a belt loop 30 may be attached to the strip 19 on the back wall, and a shoulder strap (not shown) may be provided to fit into slots (not shown) cut into the side walls 16 and 17.

Figure 5:
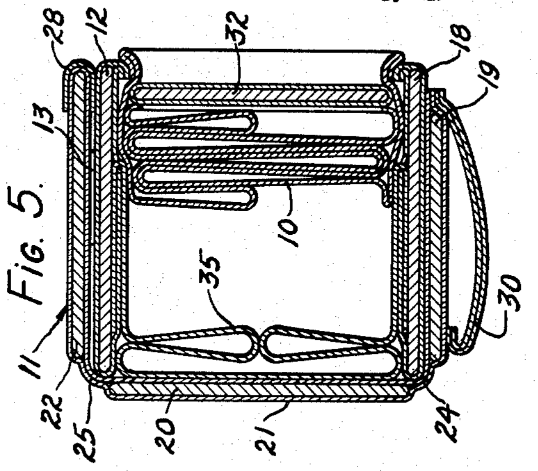
FIG. 5 is a sectional view of the empty case in its folded condition.

When the case is not in use, the flexible bag 10 may be folded and inserted into the section 11. As an aid in storing the bag, a stiffening pad 32 may be provided in the closed end of the flexible bag. The pad 32 may be wedged into the rigid upper section as shown in FIG. 5, thus serving as a frictional retainer for the folded bag.

Figure 4:
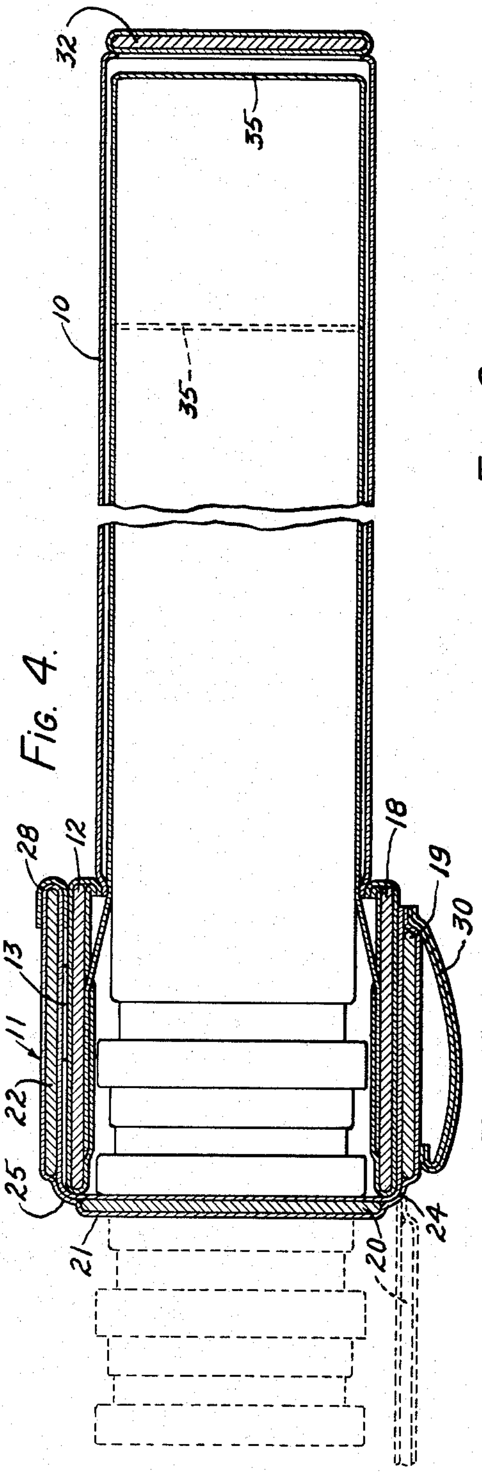
FIG. 4 is a sectional view taken along line 3—3 of FIG. 2, of the case with the camera contained therein.

To facilitate access to the camera, a band 35 of elastic material may be attached to the inside of the front wall 12 and back wall 18. A preferred embodiment of such a band is shown in its normal position in FIG. 3. When a camera is inserted into the case and the cover closed, the band 35 stretches as shown in full lines in FIG. 4. When the cover is opened, the band 35 will contract, as shown in dotted lines, partially ejecting the camera from the case.

Figure 6:
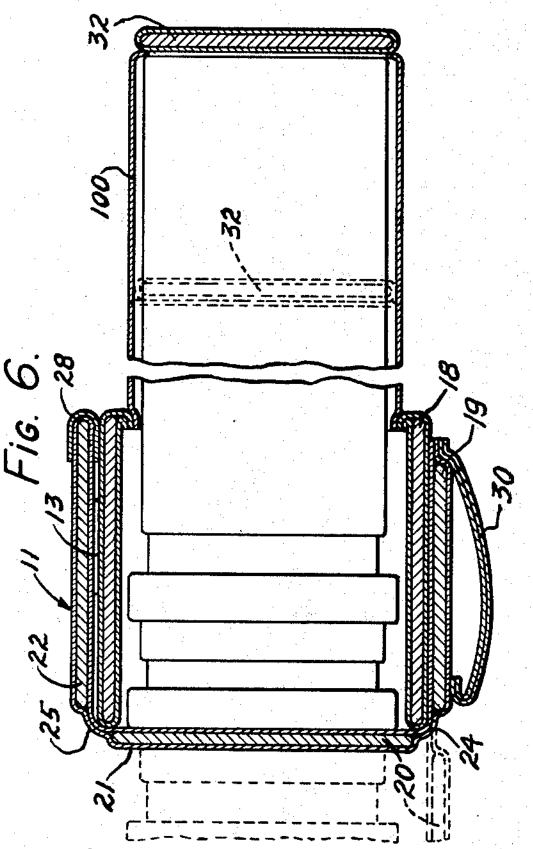
FIG. 6 is a sectional view of an alternate embodiment of the case with the camera contained therein.

Another embodiment of the ejecting means is illustrated in FIG. 6, wherein a flexible bag 100 is itself made of an elastic material that must be stretched to allow the case to be closed. Contraction of the flexible bag 100 serves to partially eject the camera when the case is opened.

It should be understood that the case herein described is presented by way of illustration only and should in no way be construed to limit my invention to these precise structural details. This example is, rather, intended to cover any and all modifications falling within the scope of the invention.

What I claim as my invention is:

1. A collapsible carrying case for an elongated article including;
   a rigid collar portion,
   a flexible bag portion extendable longitudinally from said rigid collar portion,
   a rigid pad in the bottom of said bag,
   and retaining means in said collar portion adapted to cooperate with said pad to prevent the pad and the bag attached thereto from freely falling out of said collar portion after being collapsed thereinto.

2. The carrying case of claim 1 including;
   cover means attached to one of said portions,
   first fastening means on said cover means,
   second fastening means on one of said portions, said second fastening means adapted to cooperate with said first fastening means to lock said cover over the open end of the case after an article has been received therein.

3. The carrying case of claim 1 wherein the flexible bag includes a pair of wide side panels and a pair of narrow side panels, the narrow side panels further including longitudinal preformed fold lines which permit the narrow side panels to be folded flat into substantially the same plane as the wide side panels.

4. The carrying case of claim 2 including;
   resilient means associated with the carrying case and normally tending to eject said elongated article stored therein.

5. In a collapsible carrying case,
   a substantially tubular self supporting section,
   a flexible bag extending from one end of said tubular section,
   said flexible bag being adapted to form an article receiving receptacle with said tubular section when said flexible bag is in its fully extended position,
   said flexible bag being further adapted to be collapsibly stored within said tubular section when no article is received therein,
   said tubular section and said flexible bag forming a lip means interiorly of said tubular section when the flexible bag is in its stored condition within said tubular section, and said lip means serving to retain said flexible bag within said tubular section.

6. In a collapsible carrying case:

a substantially tubular self-supporting section;

a flexible bag including side and end portions and extending from one end of said tubular section;

a substantially rigid pad at the end portion of the flexible bag most remote from the tubular section;

said flexible bag being adapted to form an article receiving receptacle with said tubular section when said flexible bag is in its fully extended position; and said flexible bag being further adapted to be collapsibly stored within said tubular section when no article is received therein.

7. A collapsible receptacle for an elongated article including:

a self-sustaining substantially tubular portion;

a flexible bag portion formed of a resilient material and attached to said tubular portion;

cover means on said receptacle;

said bag and substantially tubular portion having a combined length less than the length of the article when the cover is open;

said resilient flexible bag tending to partially eject an article stored therein; and fastening means for fastening said cover means over the end of said receptacle so as to exert a force against said article stored therein to prevent the same from being ejected.

8. In a collapsible carrying case:

a substantially tubular self supporting section having an opening at one end for receiving an article to be stored therein;

a flexible bag including side and bottom portions extending from the other end of said tubular section;

said flexible bag being adapted to form an article receiving receptacle with said tubular section when said flexible bag is in its fully extended position;

said flexible bag being further adapted to be collapsibly stored within said tubular section when no article is received therein;

cover means attached to said tubular self-supporting section;

fastening means for fastening said cover means over said opening; and an elastic member positioned within said carrying case and adapted to be deformed by the placement of an article into said carrying case, whereby said elastic member will tend to partially eject an article stored in said carrying case when said cover means is opened.

References Cited by the Examiner

UNITED STATES PATENTS

| | | | |
|---|---|---|---|
| 515,928 | 3/94 | Thompson | 190—45 |
| 1,672,322 | 6/28 | Keiser et al. | 150—1.7 |
| 2,262,318 | 11/41 | Fox. | |

FRANKLIN T. GARRETT, *Primary Examiner.*

GEORGE O. RALSTON, *Examiner.*